United States Patent [19]
Van Dyken

[11] 3,982,446
[45] Sept. 28, 1976

[54] CRUISE CONTROL APPARATUS FOR HAND GRIP THROTTLE CONTROL

[76] Inventor: Andrew Van Dyken, P.O. Box 32, 2492 85th St., Byron Center, Mich. 49315

[22] Filed: May 30, 1975

[21] Appl. No.: 581,742

[52] U.S. Cl. .................................. 74/488; 74/531; 188/77 R
[51] Int. Cl.² ..................... G05G 1/08; F16D 49/10
[58] Field of Search ................ 74/488, 489, 531; 188/77

[56] References Cited
UNITED STATES PATENTS

| | | | |
|---|---|---|---|
| 752,881 | 2/1904 | Ball | 188/77 R |
| 1,185,467 | 5/1916 | Beauchamp | 74/488 |
| 1,473,326 | 11/1923 | Slawienski | 74/489 |
| 2,776,579 | 1/1957 | Nichel, Jr. | 74/488 |
| 2,845,145 | 7/1958 | Lee | 74/531 X |

FOREIGN PATENTS OR APPLICATIONS 816,155  7/1959  United Kingdom .................. 74/531

*Primary Examiner*—Allan D. Herrmann
*Attorney, Agent, or Firm*—McGarry & Waters

[57] ABSTRACT

Cruise control apparatus for releasably holding a hand grip throttle at any given throttle position comprises a fixed position slip ring slidably riding around the outer periphery of a collar securely fastened to a rotatable hand grip throttle control. The slip ring comprises an open section with tabs extending from opposed ends of the slip ring facing the open section. A thumb actuated cam lever is employed to selectively squeeze the tabs of the slip ring together so as to clamp the slip ring on the periphery of the secured collar and hold the throttle in any desired position. The cam lever is easily released to effect immediate release of the cruise control whenever manual control is desired.

11 Claims, 6 Drawing Figures

U.S. Patent  Sept. 28, 1976  3,982,446
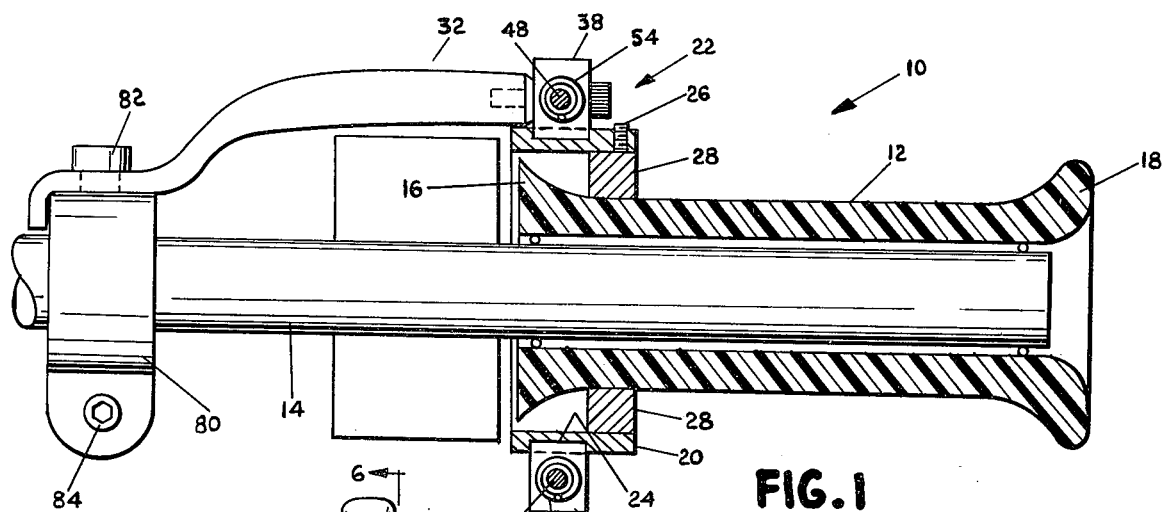
FIG. 1
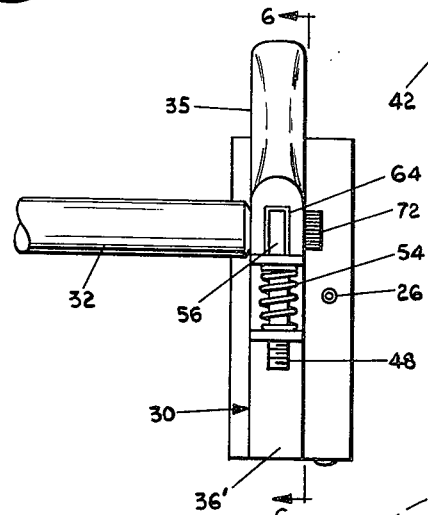
FIG. 2
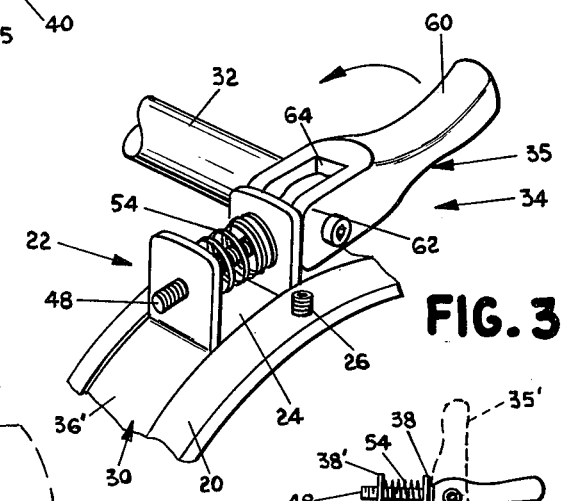
FIG. 3
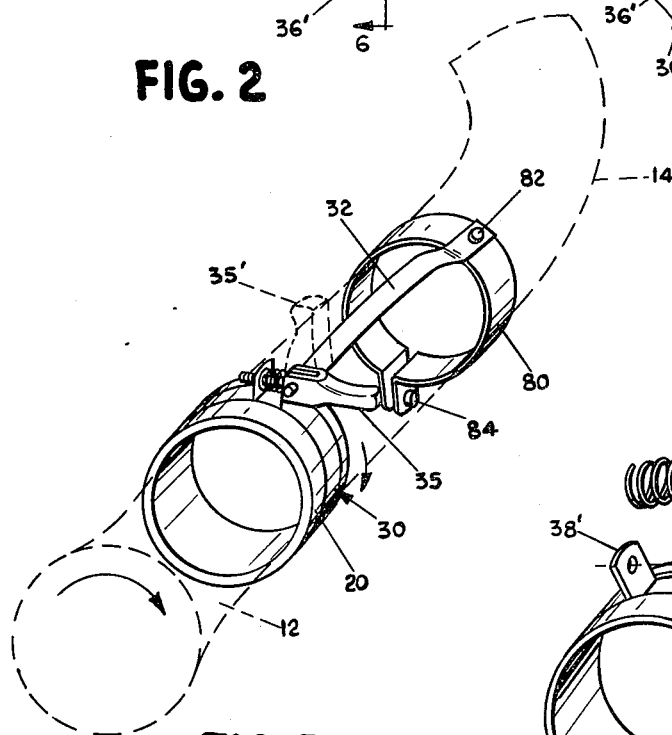
FIG. 5
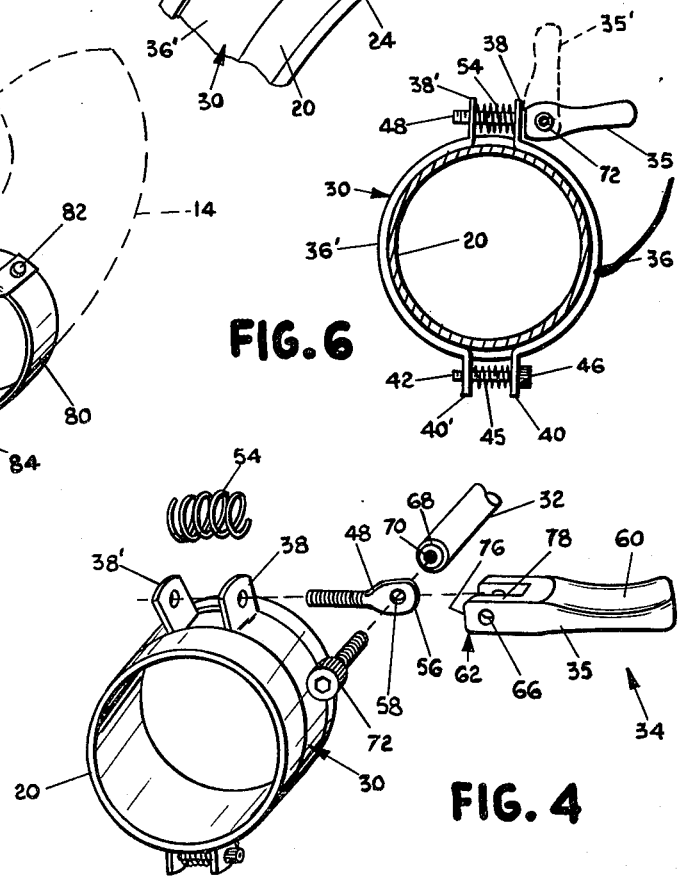
FIG. 6
FIG. 4

CRUISE CONTROL APPARATUS FOR HAND GRIP THROTTLE CONTROL

BACKGROUND OF THE INVENTION

1. Field of the Invention

The present invention relates to cruise control apparatus for a hand grip throttle control and more particularly to a thumb actuated cruise control apparatus for releasably holding a rotatable hand grip throttle in a motorcycle at any given throttle position.

2. Description of the Prior Art

My hand grip throttles, particularly those used in motor cycles, are spring biased to return to idle speed condition when the operator's hand is released. To maintain a constant speed, the operator must hold the throttle firmly at the setting desired. In long distance motorcycle touring this can become very tiring. A cruise control device for fixing the position of the hand grip throttle is desirable for relieving hand muscle fatigue during extended constant motor speed. However, for safety purposes it is necessary that such devices include a means for immediate release of the throttle in the event of an emergency or otherwise where manual control is desired.

One type of cruise control device previously developed for a hand grip throttle involves the application of a continous frictional force to the hand grip, which in effect overcomes the spring bias return and holds the throttle in any given setting. Typically, the frictional force is applied by means of a resilient spring so as to limit the force applied and permit manual movement of the throttle while the frictional force is being applied. One problem with this type of device is that the friction is applied continuously even when the throttle is being released. This necessitates an increased force in an effort to change the throttle setting and it also poses a safety problem in emergency situations wherein an automatic spring return to an idle speed is desired. Another problem with this type of cruise control device is that because the frictional force applied is limited so as to permit manual movement of the throttle while the device is applied, the locking action is not positive and the throttle position can vary as a result of vibration or the application of a slight and unintentional rotational force.

Other types of cruise control devices have employed lugs, rollers, or projections mounted on the movable hand grip, which engage serrations, corregations, teeth or detents in a member mounted on the fixed portion of the hand grip or handlebar. One problem with certain of these devices is that they do not provide a completely continuous throttle adjustment. Rather, the throttle can be adjusted only to the position where the projection mates with the corregation or the like in the fixed member. Also, as in the continuous friction system described above, such devices are sometimes applied continuously and thus nullify the desirable attribute of a spring return throttle.

SUMMARY OF THE INVENTION

The present invention comprises an improved cruise control apparatus for a rotatable hand grip throttle control mechanism, wherein the hand grip throttle is freely rotatable when the cruise control apparatus is released, but is held securely at any desired throttle setting when the cruise control apparatus is actuated.

In accordance with the present invention, cruise control apparatus for a hand grip throttle mechanism rotatably mounted on a handlebar comprises a collar positioned on the outer periphery of the hand grip for rotation therewith and a holding mechanism non-rotatably mounted on the handlebar for engaging the collar and selectively holding the hand grip at any desired throttle setting. The holding mechanism includes a manual device for selectively actuating the holding mechanism.

In the present invention, the collar comprises an annular gripping surface (preferably a groove) around the outer periphery thereof. The retainer is a slip ring retainer that rides in the groove.

The slip ring is formed with at least one open section therein such that the tension of the slip ring in the groove can be varied by squeezing the open ends of the slip ring together or spreading the ends apart. The slip ring is held in place by a stationary control arm mounted on the handlebar.

The slip ring is moved between released and actuated positions by means of tabs that extend outwardly from the open end of the ring. A fastener extends from an outer end slidably through an opening in first tab and into engagement with a threaded opening in the second tab. A spring urges the tabs apart, and an eccentric cam mechanism attached to the outer end of the fastener limits the distance that the tabs may be spread apart. The cam mechanism has a first position, wherein the tabs may be spread apart sufficiently to permit the ring to slide freely about the annular groove in the collar, and a second position, wherein the tabs are urged together such that the slip ring is held in position on the annular collar.

The tension of the slip ring in the groove can be adjusted. Desirably this tension is set so that when the cruise control device is in its actuated position, the throttle is held securely enough to prevent undesired throttle position variation, as might be caused by vehicle vibration or by the spring return on the throttle. However, the tension adjustment is limited so as to permit the operator of the vehicle to overcome the clamping force of the slip ring and manually modify the cruising speed as desired without completely releasing the cruise control device.

The actuation mechanism of the present invention is formed so that the operator of the vehicle can actuate the cruise control apparatus simply by flipping a cam lever into an upright position on the hand grip. The stationary control arm holds the hand grip throttle in the desired position (still permitting manual adjustment of cruising speed while the device is locked) until the operator desires to release the throttle completely. This is done simply by flipping the cam lever downwardly to a horizontal position.

The present invention thus provides a positive and inexpensive mechanism for holding a hand grip throttle at a desired setting, while still permitting the cruise control apparatus to be completely released quickly and easily.

These and other advantages and features of the present invention will hereinafter appear, and, for purposes of illustration, but not of limitation, a preferred embodiment of the present invention is described in detail below and shown in the appended drawings.

BRIEF DESCRIPTION OF THE DRAWINGS

FIG. 1 is a partial sectional view showing the cruise control apparatus of the invention in its assembled position on the handlebar of a motorcycle.

FIG. 2 is a broken plan view of the annular collar, slip ring and thumb actuated cam lever of the present invention.

FIG. 3 is a perspective view of the cruise control apparatus of the present invention showing the cam lever in a disengaged position.

FIG. 4 is a perspective exploded view showing the components of the present invention.

FIG. 5 is a perspective view of the present invention in its assembled position on a motorcycle handlebar.

FIG. 6 is a sectional view taken along lines 6—6 of FIG. 2.

DETAILED DESCRIPTION OF PREFERRED EMBODIMENT

Referring now to the drawings, cruise control apparatus 10 constructed in accordance with the present invention is shown for illustration purposes in FIGS. 1 and 5 mounted on a conventional rotatable hand grip throttle 12 of a motorcycle handlebar 14. Although the present invention is especially useful on a motorcycle, particularly a motorcycle having a spring return throttle, the present invention is not limited to use on motorcycles but can be used advantageously on any motorized device having a rotatable hand grip throttle.

In the illustrated embodiment, hand grip throttle 12 is formed in a conventional manner with flared inner and outer ends 16 and 18 respectively. The hand grip is rotatably mounted on handlebar 14, in order to vary the speed of the motorcycle. For safety purposes the throttle is resiliently biased to return to idle speed when the hand grip is released.

Cruise control apparatus 10 is designed to releasably hold the hand grip throttle at any desired throttle setting when a continuous speed is desired over an extended period of time. In order to accomplish this result, the cruise control apparatus comprises a fixed collar 20 mounted on the hand grip for rotation therewith and a throttle holding mechanism 22 mounted in a fixed position on the handlebar so as to be engageable with collar 20 on the hand grip. Holding mechanism 22 is movable between a released position, wherein the hand grip and annular collar are free to rotate and vary the throttle setting of the vehicle, and an actuated position, wherein the collar and hand grip are held in position at a desired throttle setting.

Collar 10 is formed of metal or the like and has an annular gripping surface 24 at the outer periphery that is adapted to engage the holding mechanism. The gripping surface preferably is an annular groove of rectangular cross section formed in the outer periphery of the collar.

Collar 10 is mounted at the inner end 16 of the hand grip and is held in position by means of set screws 26 or the like, which are mounted in threaded openings in the collar. Because the inner end of the hand grip is flared outwardly, an annular spacer 28 is placed between the collar and the hand grip to hold the collar securely in a level position.

Holding mechanism 22 engages and holds collar 10 in place by means of a slip ring retainer mechanism in the form of a split ring retainer 30 that rides in groove 24 in collar 10. A stationary arm 32 mounted on the handlebar holds the slip ring retainer in a fixed position.

The tension of the slip ring retainer is variable between a released position, wherein the slip ring slides freely in the groove as the hand grip is rotated, and an actuated position, wherein the slip ring retainer is held in a desired position in the groove. A thumb operated cam lever 34 is employed to move the slip ring retainer between its actuated and released positions when desired.

Split ring retainer 30 comprises curved sections 36 and 36' that engage opposite sides of the groove in the annular collar. Upper and lower tabs 38 and 40 and 38' and 40' extend outwardly from opposite ends of the respective sections. Tabs 38 and 38' and 40 and 40' face each other and are spaced apart a predetermined distance such that the split ring retainer can be tightened and locked on the collar by compressing the opposed tabs together.

Lower tabs 40 and 40' are resiliently fastened together by a fastener 42 that extends slidably through an opening in tab 40 and is theaded into a threaded opening in tab 40'. A coil spring or similar resilient biasing force 45 urges the lower tabs apart. A tool engaging head 46 is formed on the outer end of the fastener so that the spacing of the tabs can be adjusted.

The upper tabs 38 and 38' are similarly joined by a threaded fastener 48 that extends slidably through an opening in tab 38 and is threaded into a threaded opening in tab 38'. A coil spring 54 or other resilient biasing means urges tabs 38 and 38' apart. Fastener 48 has a flattened head 56 with an opening 58 formed therethrough in a direction perpendicular to the axis of the fastener. Head 56 of fastener 48 is attached to both cam lever 34 and stationary arm 32.

Cam lever 34 comprises a lever arm 35 having a thumb engaging surface 60 at an outer end and a cam surface 62 at an inner end. The inner end of the lever is provided with a groove 64 so that the inner end of the lever fits over the flattened end of fastener 48. An opening 66 is formed through the legs of the inner end of the lever that fits over the head of fastener 48, and this opening mates with opening 58 in the fastener.

An outer end 68 of stationary arm 32 engages inner end of lever 35 and a threaded axial opening 70 formed in the end of the arm mates with the openings in the lever arm and fastener 48.

Lever arm 35, fastener 48, and stationary arm 32 are attached together by another fastener 72 that extends from a head through the openings in the members, and into engagement with threaded opening 70 in the stationary arm. With the elements fastened together in this manner, lever arm 35 is pivotable around the axis of fastener 72 from a released position (the horizontal position shown in FIGS. 1–3) to an actuated position (the vertical position shown by phantom elements 35' in FIGS. 5 and 6). When in released position, cam surface 62 permits spring 54 to spread tabs 38 and 38' far enough apart to let the split ring slip easily in the groove in collar 10. When lever 35 is moved in its upright or actuated position, cam surface 62 engages tab 38 and moves it inwardly a sufficient distance to clamp the split ring retainer in the groove, thereby restraining relative movement of the split ring retainer and the collar. Since the split ring retainer is held in a fixed position by stationary arm 32, when lever 35 is moved upwardly to its actuated position, the hand grip is locked in whatever position it occupies at the time.

The cam surface is formed so that the cam stays in its released or actuated position until it is manually moved to the other position.

Cam surface 62 operates to move tabs 38 and 38' between actuated and released positions because the distance between opening 66 and surface 76, which is the surface engaging tab 38 when the lever arm is horizontal, is less than the distance between opening 66 and surface 78, which is the surface engaging tab 38 when the lever arm is upright.

Adjustment of the tension of the split ring retainer in the groove is conveniently provided by tightening or loosening fastener 42 joining lower tabs 40 and 40'. The same effect can be achieved with somewhat more difficulty by tightening or loosening fastener 48 joining the upper tabs 38 and 38'. The tension is adjusted to permit undesired throttle variation while the cruise control is actuated, while still permitting manual movement of the throttle to vary the cruise speed of the vehicle.

Stationary arm 32 is held in a stationary position by means of a clamp 80, which is attached to the inner end of the stationary arm and is mounted securely on the handle-bar. A rivet 82 or the like holds the stationary arm to the clamp, and a fastener 84 holds the clamp on the handlebar.

The foregoing apparatus provides a simple means for securely holding a rotatable hand grip throttle at any given throttle setting, while still providing a quick release that permits the throttle to be returned easily to purely manual operation. All the operator has to do is to flip the lever downwardly with the thumb and the cruise control is completely released, thereby letting the operator control speed manually or letting the inherent resilient biasing means in the throttle return the throttle to idle speed.

Although the split ring retainer described above provides a convenient and desirable holding mechanism for locking the hand grip in any selected position, it is contemplated that alternative structures also would accomplish this purpose. For example, instead of a two piece split ring retainer, the retainer could be a single annular member having only a single open section with outwardly extending tabs. Also, instead of having a retainer that fits in an annular groove in the annular collar, the retainer could be formed so that it covers the entire collar and has downwardly extending flanges on the outer edges that retain the retainer on the collar. Also, it is possible that the collar and the annular gripping surface could be incorporated into the handle grip. Further, it would be possible to employ alternative structures for the retainer ring, the principal operative feature of this element being that it encircles the collar and may be tightened on the collar to lock the throttle in place.

It should be understood that the embodiments desired herein are merely exemplary of the preferred practice of the present invention and that various changes and modifications may be made in the arrangements and details of construction of the embodiments described herein without departing from the spirit and scope of the present invention.

The embodiments of the invention in which an exclusive property or privilege is claimed are defined as follows:

1. Cruise control apparatus for a hand grip throttle mechanism rotatably mounted on a handlebar comprising:

an annular collar positioned on the outer periphery of the hand grip for rotation therewith, said collar having a gripping surface formed around the outer periphery thereof; and holding means non-rotatably mounted on the handlebar for engaging and selectively holding the gripping surface and hand grip at any desired throttle setting, said holding means including non-rotatable retaining means encircling the handlebar in position for engagement with the gripping surface, the retaining means being movable between a released position, wherein the collar is freely rotatable with respect to the retaining means, and an actuated position, wherein the retaining means is clamped on the gripping surface so as to hold the hand grip at a given throttle setting, said holding means further comprising manual actuation means for selectively moving the retaining means between its released and actuated positions.

2. Cruise control apparatus according to claim 1 wherein:

the gripping surface is an annular groove formed in the outer periphery of the collar; and the retaining means comprises ring means that fits in and slidably rides in the groove, the tension of the ring means in the groove being variable by the manual actuation means so as to clamp or release the ring means in the groove.

3. Cruise control apparatus according to claim 2 wherein:

the ring means has at least one open section, with two ends of the ring means being spaced apart and facing each other across said open section; and the manual actuation means engages the two ends and acts to clamp and release the ring means by squeezing the ends together and spreading the ends apart, respectively.

4. Cruise control apparatus according to claim 3 wherein:

the ring means comprises tabs extending outwardly from each of said ends; and the manual actuation means comprises:
 a fastener that extends from an outer end slidably through an opening in one tab to an inner end that is attached to the other tab;
 a resilient biasing means urging the tabs apart;
 a manually actuatable cam means attached to the outer end of the fastener so as to resist the spreading of the tabs apart, said cam means having a released position, wherein the tabs are spread apart far enough to let the ring means slide freely in the groove, and a locked position, wherein the tabs are urged together a sufficient distance to clamp the ring means on the collar, said cam means including manually operable lever means for moving the cam between its actuated and released positions.

5. Cruise control apparatus according to claim 2 wherein the holding means further comprises a bracket mounted in a fixed position on the handlebar and a stationary control arm extending from the bracket into rotation preventing engagement with the ring means.

6. Cruise control apparatus according to claim 4 wherein the holding means further comprises:
 a bracket fastened securely to the handlebar; and
 a stationary control arm having an inner end attached to the bracket and an outer end holding the ring means in a fixed angular position, the outer end of the control arm being rotatably attached to the lever means at the axis of rotation of the lever means.

7. Cruise control apparatus according to claim 2 wherein the ring means comprise a split ring formed in two opposing curved sections with tabs extending ouwardly from each end of each section, both sets of opposed tabs being connected together by fastening means that permit movement of the tabs together and apart but limit the maximum distance that the tabs may be spread apart, each pair of opposed tabs also including resilient biasing means urging the tabs apart, one set of tabs being connected to the actuation means, the actuation means serving to vary the distance said set of tabs may be moved apart by said resilient biasing means, said actuation means holding the tabs closely enough together to clamp the split ring on the collar when the actuation means is in its actuated position and said actuation means allowing the tabs to be spread apart far enough such that the split ring slides on the collar when the actuation means is in its released position, the fastener interconnecting the other set of tabs being adjustable to vary the distance between the tabs.

8. Cruise control apparatus according to claim 1 wherein the holding means clamps the hand grip with sufficient force when in its actuated position to prevent the collar from undesired rotation, but the force is small enough to permit intentional manual movement of the hand grip throttle while the apparatus is actuated.

9. Cruise control apparatus for a hand grip throttle rotatably mounted on the end of a handlebar comprising:
 an annular collar fastened securely on the hand grip for rotation therewith, said annular collar having an annular groove extending around the outer periphery thereof;
 a slip ring retainer slidably mounted in the groove, said slip ring retainer having at least one open section therein, with ends of the slip ring retainer being spaced apart and facing each other across said open section, the open section being sufficiently wide such that if the ends are moved toward each other, the ring will snugly and non-rotatably engage the groove before the ends meet, the slip ring retainer further comprising tabs extending outwardly from the ends thereof;
 fastener means extending between the tabs for limiting the distance the tabs may be spread apart, said fastener means having a head at one end outside the open section and extending slidably through an opening in one tab to an inner end, said fastener means including attaching means holding the inner end in a predetermined position with respect to the other tab, the head of the fastener being flattened in a plane lying in the axis of the fastener and having a perpendicular hold therethrough;
 resilient biasing means between the tabs urging the tabs apart;
 an elongated cam lever having a cam at an inner end and a manually engagable surface at an outer end, said cam lever having a groove in the inner end such that the head of the fastener fits in the groove, the sides of the cam lever adjacent the groove fitting over each side of the fastener, an opening being formed in said sides such that the opening mates with the opening in the head of the fastener, a second fastener extending through all three openings such that the cam lever is pivotably mounted about the axis of said second fastener, the inner end of the cam lever in engagement with the tab of the slip ring retainer and including a cam surface such that when the cam lever is in a first angular position the tabs are urged far enough apart to permit the slip ring retainer to slide freely in the groove, and when the cam lever is in a second angular position, the cam urges the tabs together sufficiently to cause the slip ring retainer to become clamped on the collar, the cam lever being easily movably between its first and second positions by manually moving the lever at the outer end, the cam surface being formed such that the cam lever remains in its first or second position until manually moved to the other position;
 a bracket attached securely to the non-rotatable handlebar; and
 a stationary control arm means attached to the bracket at an inner end thereof and extending into supporting engagement with the slip ring retainer, the control arm means having a threaded axial opening in the outer end that is threaded on the end of the second fastener after it passes through the fastener and the cam lever, the control arm means preventing rotation of the slip ring retainer with repect to the handlebar.

10. Cruise control apparatus according to claim 9 wherein the slip ring retainer comprises a split ring having sections that fit on opposite sides of the annular collar, each curved section having outwardly extending tabs on each end thereof, the sections being formed such that both pairs of tabs are spaced apart when the sections are mounted in the groove, one pair of tabs defining said one open section and the second pair of tabs defining a second open section, a third fastener extending from a head slidably through an opening in one of said second pair of tabs into threaded engagement with the other of said second pair of tabs, a resilient biasing means being positioned between the second pair of tabs and urging said second pair of tabs apart, rotation of the third fastener providing a means for adjusting the spacing of the two sections of the split ring retainer in the groove.

11. Cruise control apparatus according to claim 10 wherein the split ring is formed and positioned on the collar such that the actuation of the cruise control apparatus by moving the cam lever to its second position holds the hand grip throttle at its desired setting with a sufficiently limited force so as to permit manual movement of the hand grip throttle while the cruise control apparatus is actuated.

* * * * *

UNITED STATES PATENT AND TRADEMARK OFFICE
CERTIFICATE OF CORRECTION

PATENT NO. : 3,982,446
DATED : September 28, 1976
INVENTOR(S) : ANDREW VAN DYKEN It is certified that error appears in the above-identified patent and that said Letters Patent are hereby corrected as shown below:

Column 1, line 13, "My" should be --Many--.

Column 2, line 10, the word "device" should be preceded by the word --actuation--.

Claim 7, column 7, lines 6 and 7, "ouwardly" should be --outwardly--.

Signed and Sealed this

Thirtieth Day of November 1976

[SEAL]

Attest:

RUTH C. MASON
*Attesting Officer*

C. MARSHALL DANN
*Commissioner of Patents and Trademarks*